(12) United States Patent
Feller (10) Patent No.: US 8,590,361 B1
(45) Date of Patent: Nov. 26, 2013

(54) MAGNETIC FLOW METERS WITH AUTOMATIC FIELD MAINTENANCE

(75) Inventor: Murray F Feller, Micanopy, FL (US)

(73) Assignee: Onicon, Inc., Clearwater, FL (US)

( * ) Notice: Subject to any disclaimer, the term of this patent is extended or adjusted under 35 U.S.C. 154(b) by 160 days.

(21) Appl. No.: 13/360,288

(22) Filed: Jan. 27, 2012

(51) Int. Cl.
*G01F 1/60* (2006.01)

(52) U.S. Cl.
USPC ............. 73/1.34; 73/1.88; 73/861.08; 702/87

(58) Field of Classification Search
USPC .......................... 73/1.34, 1.88; 700/8; 702/87
See application file for complete search history.

(56) References Cited

U.S. PATENT DOCUMENTS

| | | | | |
|---|---|---|---|---|
| 4,263,803 A | * | 4/1981 | Burkhardt | 73/1.81 |
| 4,446,715 A | * | 5/1984 | Bailey | 73/1.88 |
| 4,457,808 A | * | 7/1984 | Taylor et al. | 205/782.5 |
| 4,676,112 A | | 6/1987 | Uematsu et al. | |
| 5,228,327 A | * | 7/1993 | Bruck | 73/1.34 |
| 5,275,035 A | * | 1/1994 | Baer | 73/1.61 |
| 5,355,730 A | * | 10/1994 | Koizumi | 73/497 |
| 6,279,375 B1 | * | 8/2001 | Draxelmayr | 73/1.88 |
| 6,431,011 B1 | | 8/2002 | Feller | |
| 6,463,807 B1 | | 10/2002 | Feller | |
| 6,609,075 B1 | * | 8/2003 | Warburton et al. | 702/87 |
| 7,114,400 B2 | | 10/2006 | Florin | |
| 8,047,080 B2 | * | 11/2011 | Ishikawa et al. | 73/861.12 |
| 2003/0051557 A1 | * | 3/2003 | Ishikawa et al. | 73/861.12 |
| 2004/0210410 A1 | * | 10/2004 | Matsumura et al. | 702/100 |
| 2006/0095217 A1 | | 5/2006 | Coursolle | |
| 2007/0151321 A1 | * | 7/2007 | Ohmi et al. | 73/1.62 |
| 2007/0185667 A1 | | 8/2007 | Asquith | |
| 2009/0013800 A1 | * | 1/2009 | Mehendale et al. | 73/861.356 |

FOREIGN PATENT DOCUMENTS

GB 2309308 A 7/1997

* cited by examiner

*Primary Examiner* — Hezron E Williams
*Assistant Examiner* — Alexander Mercado
(74) *Attorney, Agent, or Firm* — David Kiewit (57) ABSTRACT

Zero and calibration drift errors in a magnetic flow meter can be detected and automatically corrected. A zero error can be detected by measuring an amplifier output when the meter's electromagnet is inactive. Automatic calibration of the span can be done by adding a signal to a measured electrode voltage at an amplifier input, subtracting the expected amplified value of that signal at the output and adjusting the amplifier gain responsive to the difference in signal magnitude.

8 Claims, 5 Drawing Sheets

MAGNETIC FLOW METERS WITH AUTOMATIC FIELD MAINTENANCE

BACKGROUND OF THE INVENTION

The invention relates to measuring the rate of flow of conducting fluids by electromagnetic induction (i.e., Faraday meters). More specifically, the invention relates to in situ calibration of such instruments.

BACKGROUND INFORMATION

Magnetic flow meters provide output flow rate signals having a magnitude proportional to an amplification scaling factor of an amplifier circuit used to boost the electromagnetically generated signals to the desired output levels.

Magnetic flow meters are subject to undetected field failures and to various drift errors which can have serious economic consequences. Diagnostic tests can be performed on magnetic flow meters in the field to determine their operating condition but this typically requires that during the tests, the meters not be measuring flow rate. This meter down time can discourage operators from making the tests so that failures may go undetected for a long time.

There is thus a need to provide field tests which are much shorter in duration and which do not inhibit or interrupt the normal measurement operation of the meter. There is a further need to automatically make meter calibration adjustments on operating meters in order to minimize their removal and replacement.

BRIEF SUMMARY OF THE INVENTION

The present invention provides means for diagnostic monitoring of magnetic flow meter functions and for automatic compensation with little or no need for interrupting normal measurement operation.

One aspect of the invention is that it provides apparatus for automatically calibrating a magnetic flow meter comprising an electromagnet and a pair of sensing electrodes connected to an amplifier circuit operable to amplify electrode voltages by a selected amplification factor. In a preferred embodiment this apparatus comprises a single voltage source selectively connectable to an input and to an output of the amplifier circuit; sampling circuitry operable to determine a magnitude of an error difference between a first output from the amplifier circuit at a first time when the single voltage reference source is connected and a second output from the amplifier circuit at a second time when the single voltage reference source is not connected; and span control circuitry operable to change the selected amplification factor responsive to the magnitude of the error difference. In this arrangement the single voltage reference source is selectively connectable to the input of the amplifier circuit through a first voltage divider and to the output of the amplifier circuit through a second voltage divider, wherein a ratio of the voltage provided by the second voltage divider to the voltage provided by the first voltage divider is substantially equal to the selected amplification factor.

Another aspect of the invention is that it provides a method of automatically calibrating a magnetic flow meter during the meter's routine operation. In this case the flow meter comprises an electromagnet, a pair of flow sensing electrodes for generating a flow voltage proportional to a flow of fluid and drive circuitry 115 providing a series of drive pulses to the electromagnet. The sensing electrodes are connected to an amplifier having a selected amplification. One step in the method involves measuring a first amplified value by adding, during a first selected drive pulse, a first reference voltage to the flow voltage at the input of the amplifier and simultaneously subtracting, from an output of the amplifier, a second reference voltage having a magnitude substantially equal to a product of the first reference voltage and the selected amplification. Another step involves measuring a second amplified value during a second selected drive pulse during which the first and second reference voltages are not connected to the amplifier. And a third step involves determining, from a difference between the first and second amplified values, a new selected amplification that will reduce a magnitude of the difference.

Yet another aspect of the invention is that it provides a method of automatically setting a zero point of a magnetic flow meter during the meter's routine operation. In this case the flow meter uses drive circuitry 115 providing a series of drive pulses to an electromagnet. These pulses are separated by 'dead time' intervals during which the electromagnet is not powered and the electromagnetically induced voltage at the sensing electrodes is necessarily zero. The preferred method, carried out during a dead time interval, involves detecting and retaining amplified zero signals and corresponding amplified signals measured when the inputs are shorted out. The difference between the two retained signals provides a voltage that is used to control the amplifier zero setting so as to minimize that difference.

The reader should recognize that the apparatus and methods described herein are directed at routine drifts and other generally small but significant changes that are expected during the service life of a flowmeter. Major problems that may arise due to circuit failure, excessive ambient noise, etc. are beyond the scope of the inventive system and are addressed by providing alarms indicating the need for service or repair.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

Figure 1:
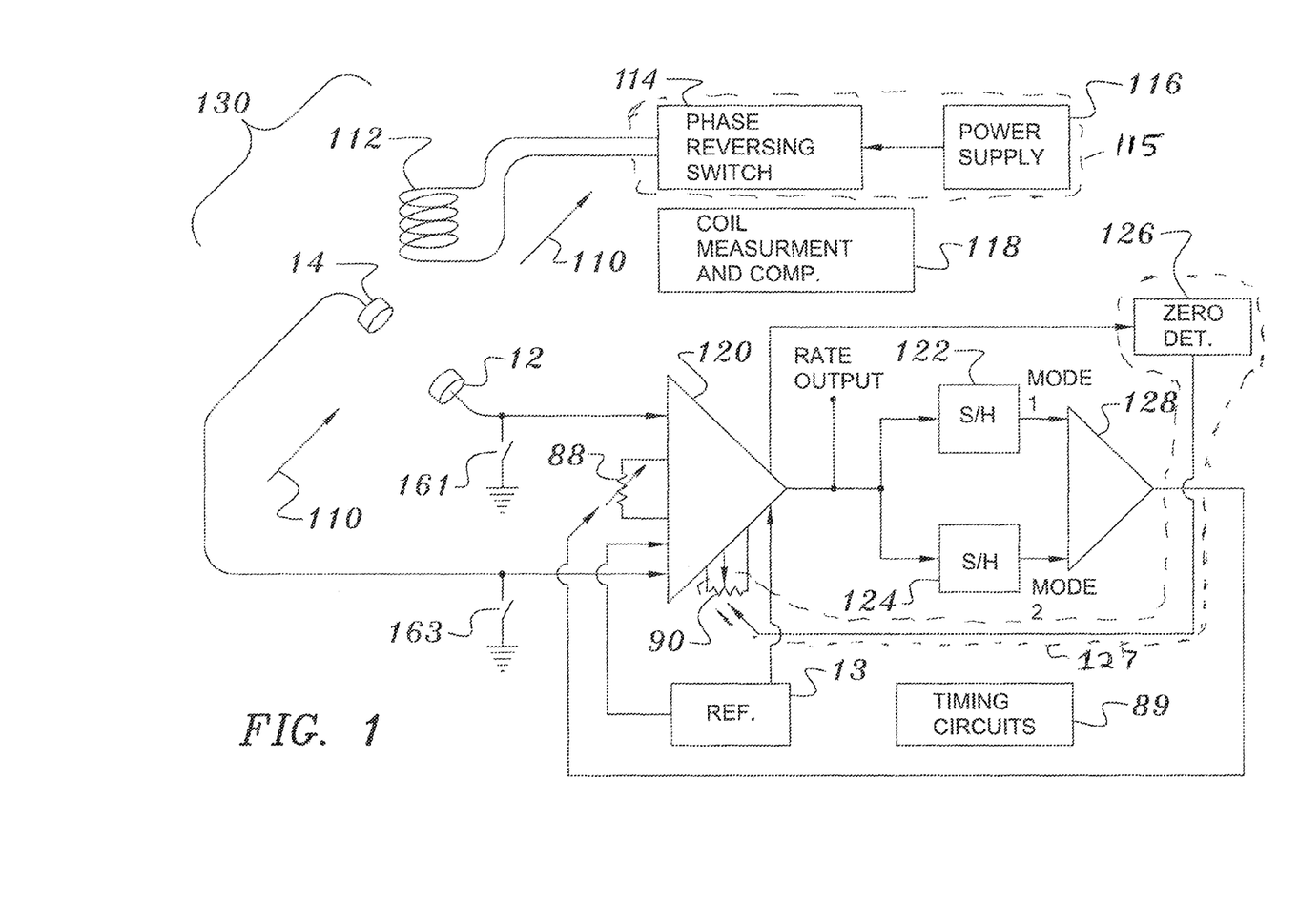
FIG. 1 is a simplified block diagram of an automatic maintenance system of the invention.

Four major areas are addressed for diagnostic monitoring and automatic compensation and one or more of them may be used as desired. They are signal amplification or span, meter zero, electrode maintenance and magnetic flux determination. In FIG. 1, a simplified block diagram of a magnetic flow meter 130 is shown. Here the electrodes 12 and 14 detect the signals generated in the flowing fluid 110 in which an electromagnet 112 produces a magnetic flux orthogonal to both the axis between the electrodes and the axis of the flowing fluid. The coil inductance and resistance are measured by a circuit 118 to control the coil current.

An amplifier 120 amplifies input signals and has gain and offset control provisions, shown as resistors 88, 90 respectively. A single voltage reference 13 provides the input signal offset and output cancelling voltages. Sample and hold circuits 122 and 124 detect the output signal for operation with and without the reference voltages. The difference in output between the two modes is used to control the amplification of the amplifier 120. The amplifier 120 also provides a signal to zero control circuitry 127 comprising a zero detection circuit 126 which controls the zero setting—e.g., by adjusting the wiper position of variable resistor 90. The current through the coil is controlled in direction by reversing switch 114 and in magnitude by regulated supply 116.

Most of the electronic circuitry in a magnetic flow meter is associated with detecting and processing the signals sensed by the electrodes so that if their signal paths were being diagnostically monitored with provisions for compensation while still permitting normal flow meter operation, the reliability of such a meter would be greatly improved. In preferred embodiments of the present invention, a reference test (span) signal is introduced into or near the input of each signal path and amplified in that path along with the flow related signal to appear near the path's output as an offset. The reference signal is also differentially applied near the signal path's output and its level is adjusted so as to exactly cancel the offset of the input reference test signal. Thus, if the meter is properly calibrated the same output signal is obtained whether or not the reference signals are present. Any deviation from that cancellation produces an error signal which can be used to make signal path gain adjustments to restore the gain or provide the equivalent compensation.

The input and output reference signals are activated and deactivated together at the same time at a periodic rate. The output signal levels for the two cases, when the reference signals are and are not present, are detected. If they are not equal, corrective action is required. The difference voltage between the output signals with and without the reference signals may be used in a negative feedback loop to adjust an electronic gain control trimmer resistor 88 in the signal path so that the output levels are made equal. As an alternative, a compensating adjustment of the scaling setting in an output signal digital processor that provides an open loop correction (not shown) may be also used. It is further noted that the processor may also provide the feedback control signal for the resistor in closed loop operation.

As an example, consider a magnetic flow meter of the invention in which the gain of the input amplifier 120 is selected to be 1000, and in which the reference signal input is set at 1 mV. Thus the reference signal supplied for subtraction at the output is set equal to the expected amplified value of the input reference signal—i.e., the reference signal supplied to the output is 1 V. Further, assume that the flow input signal from the electrodes 12, 14 is 1 mV. In this case the output reference voltage would cancel the input reference voltages so that the rate correct output of 1 V would be obtained. The sample and hold circuits 122, 124 would each provide a 1 V signal to the differential amplifier 128, leading to a zero output correction signal. Continuing with the example, assume that the gain of the amplifier 120 suddenly doubled. During the time that the reference source was inactive one of the sample and hold circuits 122, 124 would capture a value of 2 V. During the interval in which the reference source was active 4V would be captured by the other sample and hold 124, 122. The output reference would remove the selected value of 1 V from the total 4V output from the initial amplifier 120 so that the other sample and hold 124, 122 would capture a value of 3V. The differential amplifier 128 would then output the 1 V error correction signal that could be used either in a negative feedback loop or an open loop to make the correction or could be used to provide an alarm.

In a preferred magnetic flow meter configuration, the pulsed magnetic field alternates in polarity so that the flow induced signals detected by the electrodes also alternate. Phase reversal switches are used in the signal amplification and processing to provide a DC level corresponding to flow rate. Although zero drift is low, there is always some related error which is detected and compensated for in the following way. During an interval between drive pulses when the magnetic field is zero, the amplified electrode signals are detected and used as error signals to control an adjustable resistor to restore the output signal to zero or alternately to input a digital processor to introduce the equivalent offset in its output signals or control the resistor. In a preferred zero adjustment method the output level from the instrument amplifier 120 is detected by a zero detector 126 when the amplifier input is in its normal configuration and when its input is shorted. The difference between the normal and shorted cases is then used to adjust a zero trimmer 90 so as to minimize the zero error of the output rate signal.

Note that the span measurement can also be made during dead times between drive pulses when the field is zero. This, however, fails to duplicate artifacts that may be present during the actual flow measurement periods and is therefore less desirable.

Although many flow meters incorporate means to measure and maintain a constant value of the current through the coil to establish the magnetic field, the field intensity is not actually measured. If the actual magnetic field changes (e.g., because of a shorted turn) that change would not be detected. Although the meter would continue to operate, its calibration would be in error.

In preferred embodiments of the present invention, the inductance of the coil is also measured. Since a magnetic core is preferably used with the coil, the coupling between the turns is relatively tight and a shorted turn is readily detectable by preferably measuring the current rise and/or fall time by direct measurement. This determination preferably includes a measurement of the effect of electrical resistance on rise time and includes a coil temperature measurement as indicated by the rise time measurement circuitry 400 depicted in FIG. 4. If the rise time is not within acceptable limits, the current through the coil can be adjusted to restore the magnetic field to its original value. Alternately, an analog or digital adjustment can be made for the equivalent compensation. These measurements and adjustments do not require that the meter stop producing useful measurements.

Figure 2A:
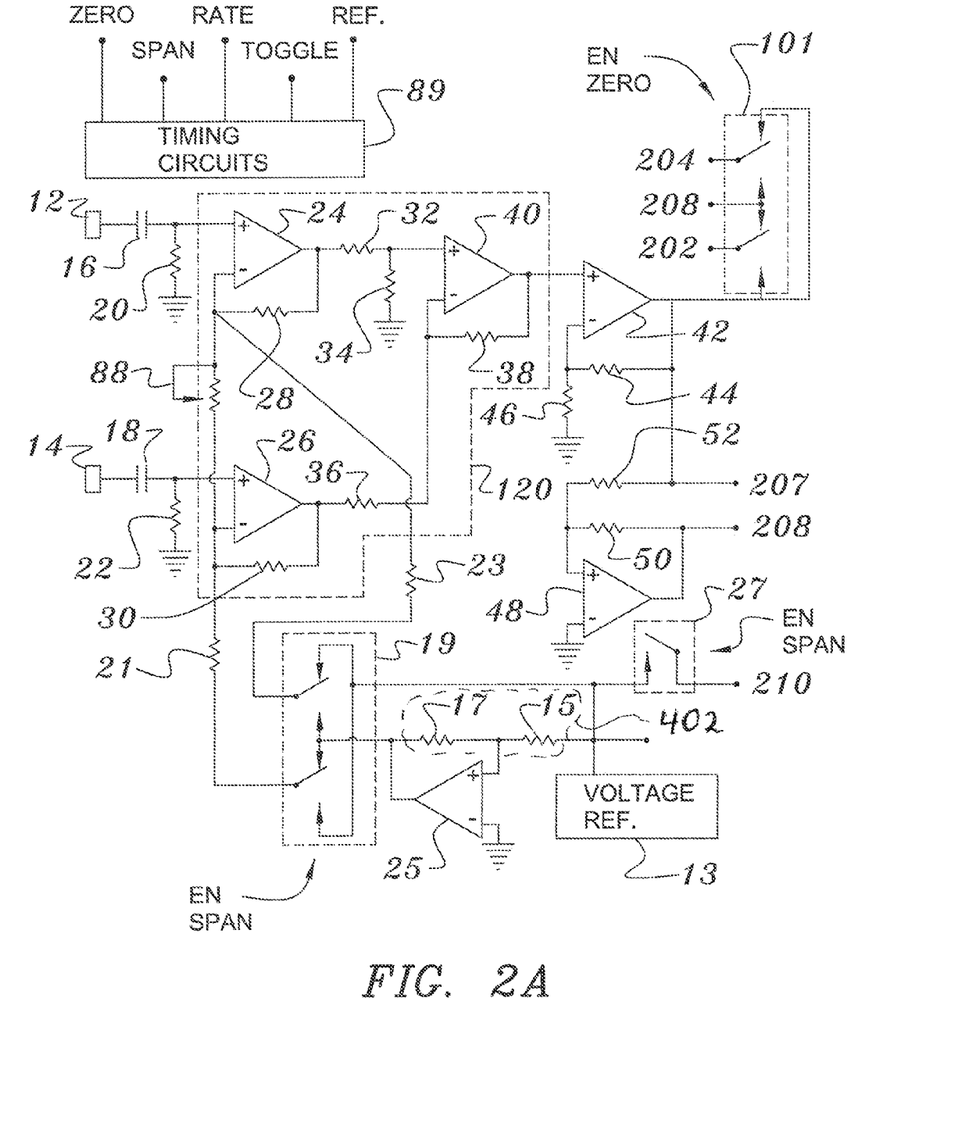
FIGS. 2A and 2B, taken together when connected at the points 202, 204, 206, 207, 208, and 210, provide a schematic circuit diagram of a preferred automatic recalibration and re-zeroing arrangement of the invention.
Figure 2B:
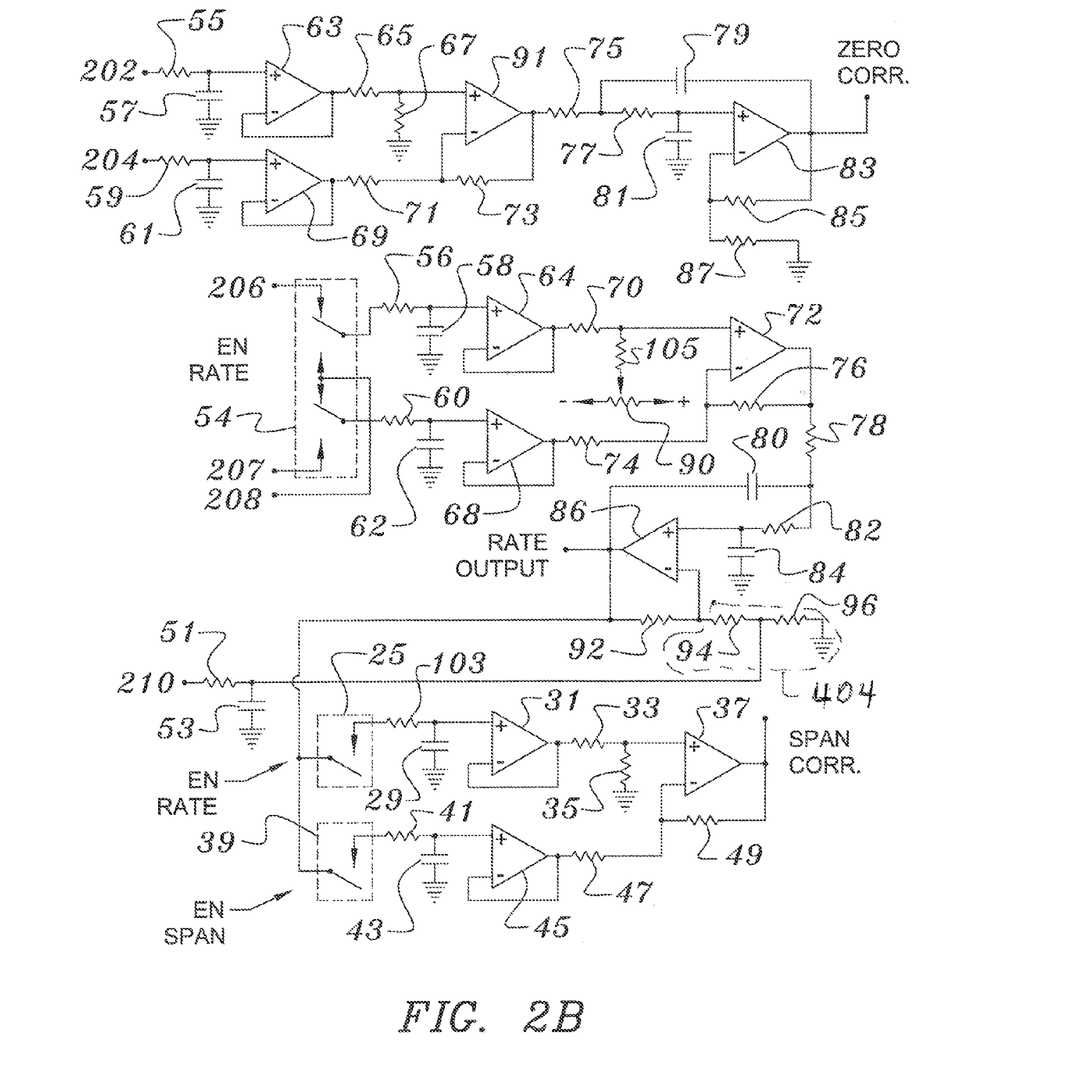

FIG. 2 illustrates a more detailed, although still simplified, schematic diagram of the measurement and control circuitry used by a preferred embodiment of the present invention. The pickup electrodes 12 and 14 sense signals developed in the flow path under the influence of the meter's magnetic field and route them through DC decoupling filters comprised of capacitor 16 and resistor 20; and capacitor 18 and resistor 22, to the positive inputs of respective input amplifiers 24 and 26. These amplifiers, along with a differential output amplifier 40 having associated resistors 28, 30, 32, 34, 36 and 38 comprise an instrumentation amplifier circuit, where an adjustable resistor 88 provides a means for changing its amplification factor.

The signal from the amplifier 40 is input to amplifier 42 which is gain controlled by resistors 44 and 46, and which has an output that is inverted by inverter amplifier 48 in conjunction with resistors 50 and 52. The output from both amplifiers 42 and 48 enter a phase reversing switch 54 which selectively rectifies and transfers their signals to the sample and hold circuits of amplifier 64 with capacitor 58 and resistor 56, and amplifier 68 with capacitor 62 and resistor 60. The outputs from amplifiers 64 and 68 enter differential amplifier 72 with its associated resistors 70, 105, 74 and 76 with adjustable resistor 90 providing a means for adjusting its zero offset. The output signal from amplifier 72 is further amplified by amplifier 86 in conjunction with its gain setting and voltage dividing resistors 92, 94 and 96 and its low pass filter consisting of resistors 78 and 82, and capacitors 80 and 84.

In some embodiments the electromagnet supplying the magnetic flux for flow rate detection receives alternating polarity current pulses of short duration (e.g., 5 milliseconds) which is short relative to the pulse rate, which may be 12.5 pulses per second. The current pulses are electronically regulated to become stable toward the end of their period which is when the rate timing pulse from the timing circuits' block 89 is present to enable a switch 54 to transfer the amplified electrode signals to the sample and hold circuits. This switch 54 is also toggled at the current pulse frequency to provide signal rectification, after which further amplification and low pass filtering is employed to provide the output rate signal.

In a preferred method of operation the electrode signals are processed as discussed above for a selected number of measurement cycles (e.g., 100), and then in a second (span) mode for another 100 measurement cycles. During the span mode the input to the signal path includes a first reference signal which is processed with the electrode signals. A second reference signal derived from the same reference signal source as the first reference signal is then suitably scaled and subtracted at the end of the signal path. If the amplification factor of the circuit is equal to the ratio of the two reference signals, the output signal is the same in both modes and so it cancels. If there is a difference between the output signals from the two modes, it is used as an error indication and provides the control signal that reduces the difference signal to allowable limits.

In a preferred embodiment a single voltage reference 13 provides a DC level which is conducted in pulses by the enable span signal coincident with the rate enable signal. The voltage reference also provides a positive voltage to an amplifier 25 that is configured with resistors 15 and 17 as an inverter so that reversing the switch 19 alternately supplies positive and negative pulse signals at the toggle frequency to resistors 21 and 23 when the span enable timing signal is present. When that timing signal is present, two amplifiers 24 and 26 have their outputs shifted by the reference signal. The voltage reference through switch 27 also provides an offset voltage to amplifier 86 to cancel the offset introduced at the beginning of the signal path. Switch 27 is also switched on by the enable span signal when the span mode is operational while resistor 51 and capacitor 53 form a symbolic low pass filter to provide a frequency response similar to that of the signal path for reducing the output signal transients when switching between modes.

The use of a single voltage source 13 combined with two voltage divider networks 402, 404 that are entirely resistive is particularly advantageous to the invention. In this case the voltages added at the input and subtracted by the output are defined not solely by a voltage source, but also by a ratio defined entirely by the resistive voltage dividers. That is, the voltage divider ratio is matched to the selected gain of the amplifier circuit and can remain constant when the output voltage of the voltage source drifts or otherwise changes.

In a preferred embodiment, the resistive voltage divider networks 402, 404 are comprised entirely of resistors selected for their nominal accuracy and for rated stability under all conditions, such as changes in source voltage and ambient temperature as well as long term corrosion and other degradation problems. The use of high precision wire-wound or thin film resistors can provide resistive voltage divider networks that change by no more than 0.1% over the expected service life of a magnetic flow meter that has a specified accuracy of 1.0%.

When the enable rate timing pulse occurs, switch 25 connects the rate output signal by itself through a resistor 103 to charge up capacitor 29. Amplifier 31 provides buffering of that voltage which is then connected through the voltage divider made from resistors 33 and 35 to the positive input of differential amplifier 37. When the enable span timing pulse occurs switch 39 connects the rate output signal, which now includes the addition and subtraction of the reference signals, through resistor 41 to capacitor 43. Amplifier 45 provides buffering of that voltage which is then connected through resistor 47 to the negative input of differential amplifier 37. Resistor 49 is a feedback resistor. These components make up two sample and hold circuits and a differential amplifier which provides as an output voltage the difference between the rate output signal for the two modes of operation; that of flow measurement and that of flow measurement with the addition and subtraction of the reference signals. The output from amplifier 37 is the span correction signal which can be directly or indirectly used to control the gain resistor 88, or to provide a compensation signal to adjust the output level from another output amplifier or more typically, a digital processor. It is further noted that several consecutive cycles of operation would typically occur in each mode before a mode change to enable the sample and hold capacitors 29, 43 to fully charge.

A preferred magnetic flow meter using a pulsed magnetic field typically has relatively long periods between the pulses when the magnetic field is essentially zero. At these times, the voltages generated by the fluid flow are essentially zero so that a zero test of the meter may be performed and a zero adjustment made or compensated for, to restore that calibration point. When the magnetic field is not present a zero enable pulse from the timing circuits enables a polarity reversing switch 101 to transfer signals from the amplifiers 42 and 48 to the input filters composed of resistor 55 and capacitor 57, and resistor 59 and capacitor 61, and their respective amplifiers 63 and 69. Their outputs to resistors 65, 67, 71 and 73, in conjunction with amplifier 91, form a differential amplifier with an output to the low pass filter and amplifier 83 comprised of resistors 75, 77, 85 and 87, and capacitors 79 and 81 to provide the zero error signals. This signal is then used to control the wiper position of a resistor 90 to set the zero output signal or alternately, by an equivalent compensation of an output digital processor (not shown).

Electrical noise from power lines at 50 or 60 Hz, or other sources, can show up as a zero error that can be addressed by a preferred zero compensation arrangement involving multiple measurements during dead time intervals. The amplified signals are measured and stored when the electrodes 12, 14 are normally connected, and again when the electrodes are shorted at the amplifier inputs (e.g., as indicated schematically in FIG. 1 by switches 161,163). The difference between the two values is then used, for example, to adjust the trimmer 90 to reduce the zero error of the rate output signal.

The inductance of the electromagnet is continuously determined by measurement of the rise time 107 of the current pulse through it. This method permits the meter to measure flow rate normally while the measurement is being made. If the inductance deviates significantly from the desired value, the coil current is changed to compensate so that the overall rate calibration is maintained. Alternatively, the gain of the signal path amplifier or calibration constant of the output digital processor can be adjusted for the correction.

In some installations using magnetic flow meters the pipes that the meters are mounted on may occasionally be empty. Under these conditions, the meters will produce erroneous flow rate indications which could lead to serious implications if not quickly identified. Meters may be equipped with empty pipe detectors which identify such conditions and force the meter output to indicate zero flow rate. This disclosure presents a highly cost effective empty pipe detector which offers the additional advantage of maintaining the electrodes in a relatively clean state.

One or more of the flow sensing electrodes, when connected through a high resistance to a positive potential direct current source, is used with suitable amplification to detect the presence of liquid in the pipe. The shunting effect of the resistance on the flow responsive signal is greatly reduced by modulating the current source with an in-phase amplified version of the flow responsive signal.

Figure 3:
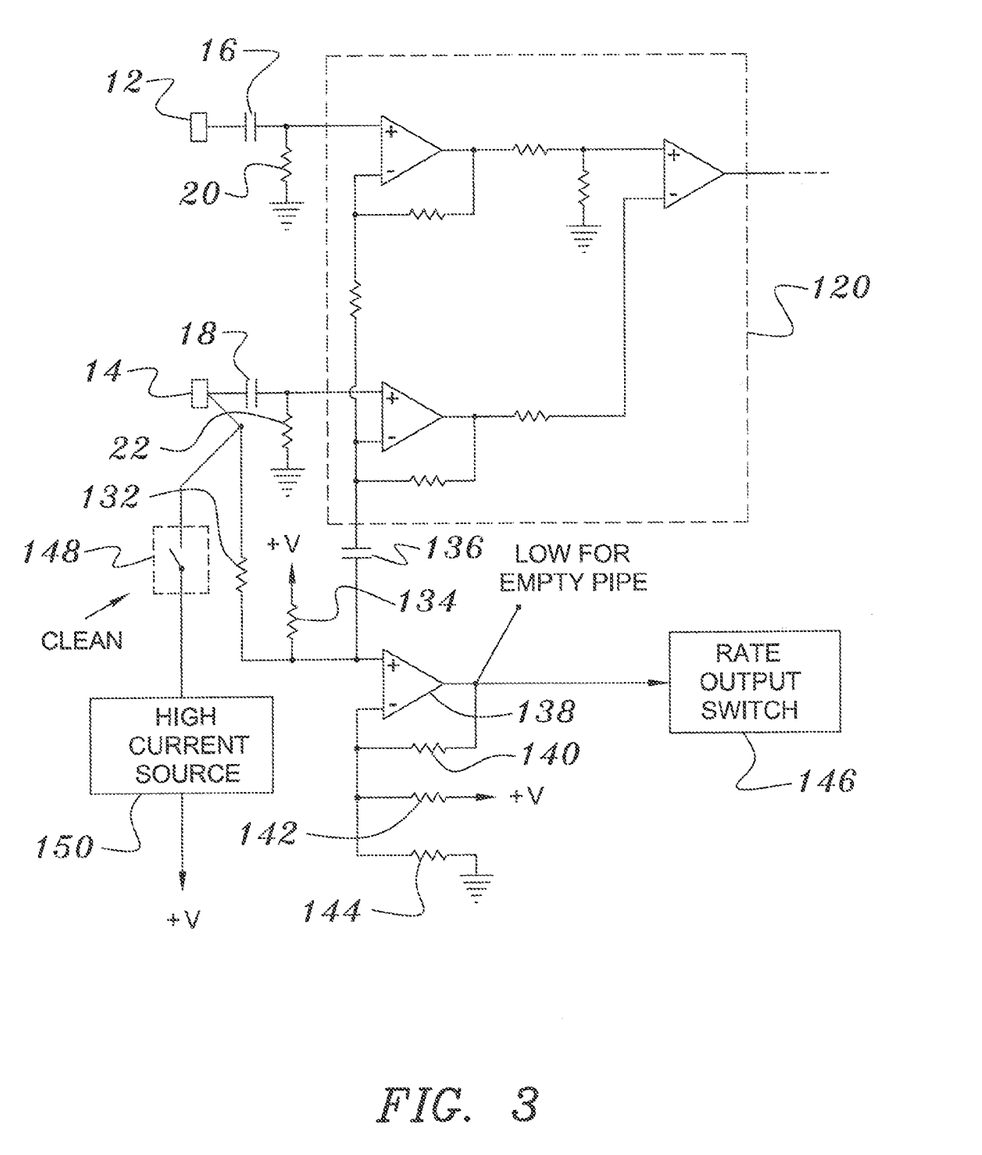
FIG. 3 is a schematic block diagram of an empty pipe detector usable with the invention.

The simplified block/schematic diagram of FIG. 3 illustrates the basic configuration of the empty pipe detector. Block 120 is an instrumentation amplifier having, as a first input, the signal coupled from electrode 12 through a capacitor 16 having a ground reference resistor 20. Correspondingly, the signal from the other electrode 14 passes through capacitor 18 having ground reference resistor 22 and is connected to the other input. Additionally, the electrode 14 is connected to two resistors 132, 134 which provide a current source driven by the positive voltage source. A capacitor 136 provides a path for the amplified electrode signal to modulate the voltage at the bottom of resistor 132 in phase with the electrode signal. The signal voltage across that resistor 132 and consequently the current through it is therefore very low so that its loading on the electrode signal is negligible. For example, if the amplified voltage is 90% of the electrode signal voltage, the voltage across and current through the resistor is 10% of what it would have been had the resistor instead been grounded so that its effective resistance in the circuit shown is therefore increased by a factor of ten.

When the electrode 14 is in air, for example, there is no conductive path between it and the ground surfaces, so that the current source raises the potential on the negative input of an amplifier 138 above that on its positive input, which is determined primarily by the ratio of two resistors 142, 144. When this is the case, the output from the amplifier 138 is low, which indicates an empty pipe condition, allowing the output from the meter to be switched to zero by a rate output switch 146. On the other hand, when a liquid provides a conductive path between the electrode and the ground surfaces the voltage on the negative input to the amplifier 138 drops below that of the corresponding value at the positive input. This drives the output high, which is indicative of a pipe containing a conductive liquid. Resistor 140 provides a small amount of positive feedback for switching hysteresis to provide clean switching.

By polarizing the sensing electrodes positive with respect to the other grounded metallic surfaces of the meter and pipe which make up the return electrode, the sensing electrodes are maintained clean by electrolysis. The return electrode, e.g., the pipe, flow meter body and fittings, eventually develops a low conducting coating but since its area is much greater than that of the sensing electrodes, the formation of that coating proceeds very slowly and has negligible overall effect for the life of the meter.

Optionally, the sensing electrodes 12, 14 may be switched for a short time to a much higher current source for rapid cleaning. In this case a switch 148 enables a relatively high current supplied by a cleaning current source 150 to flow through electrode 14 for occasional heavy duty cleaning as may be desired.

The reader will recognize that although various details in the foregoing discussion and in FIG. 3 address only the cleaning of one of the electrodes 14, the same method and apparatus are equally applicable to cleaning the other electrode 12.

As part of the automatic maintenance process, the condition of the electromagnet is determined by measuring the rise time of the current through the electromagnet. Since the rise time is directly proportional to the magnet's inductance and inversely proportional to its resistance which varies with temperature, a temperature measurement is made of the electromagnet so that the inductance can be precisely determined and compared against the value stored in the meter when it was manufactured. If an inductance change has occurred, for example the inductance has decreased, resulting in a reduction in magnetic flux used for measuring flow rate, the output signal processor changes its calibration factor to make the output rate signal correction.

Also as part of the automatic maintenance process, when a flow measurement is made the magnitude of the current through the electromagnet is measured and compared against that stored in the meter when it was manufactured. If that current has changed, the output signal processor can change its calibration factor to make the output signal correction.

Figure 4:
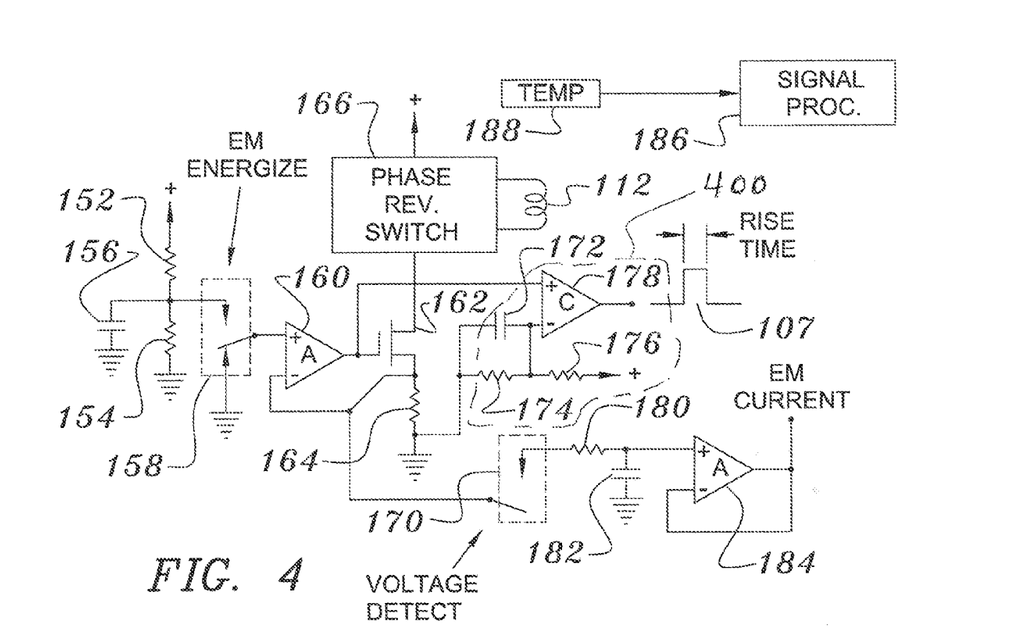
FIG. 4 is a schematic block diagram of a circuit for detecting flaws in the electromagnetic coil portion of a magnetic flow meter.
Figure 5:
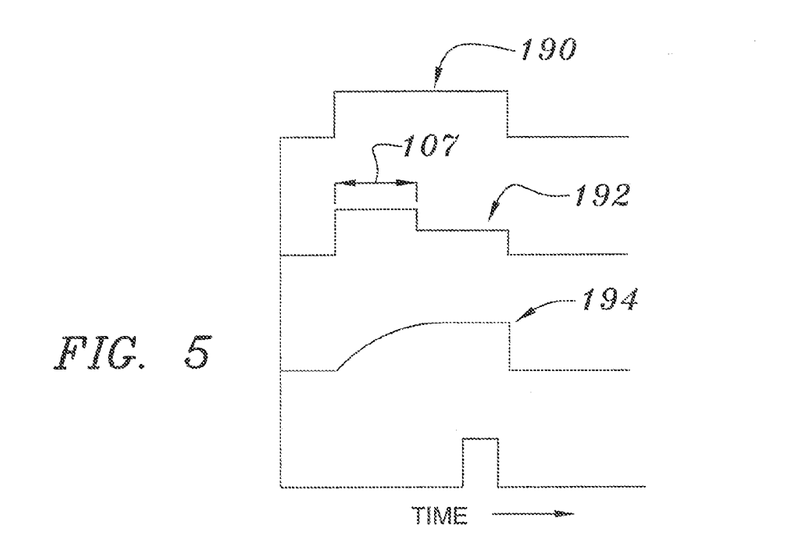
FIG. 5 is a timing diagram depicting operating of the circuit of FIG. 4.

The simplified block/schematic diagram of FIG. 4 illustrates the basic configuration for determining the condition of the electromagnet and the level of the current through it. The voltage divider comprised of resistors 152 and 154, with capacitor 156 providing low pass filtering, sets the positive input signal level through a switch 158 to an amplifier 160 while the electromagnet timing pulse 190 is active, as indicated in FIG. 5. The amplifier's high output 192 drives the gate of FET 162 high so that it is initially switched on to full conduction at which time its current is routed through a phase reversing switch 166 and limited by the inductance and resistance of the electromagnet 112. Once the electromagnet current 194 reaches the value where the voltage across the current sensing resistor 164 approximately equals that from the voltage divider, the amplifier drops its output voltage to regulate the coil current at that value for the remainder of the timing pulse 190. Comparator 178 has its negative input biased by the voltage divider consisting of resistors 174 and 176 with low pass filtering provided by capacitor 172, so that the voltage excursion on its positive input produces a pulse 107 having a width corresponding to the rise time of the electromagnet current.

The time between the amplifier 160 pulse being high and then dropping to a lower value to sustain the desired constant current for flow measurement is proportional to a product of the electromagnet's inductance and resistance. The latter of these is also affected by its temperature. The electromagnet temperature is measured by temperature sensor 188 with its signal entering the signal processor 186 to compensate for the electromagnet resistance so that any change in inductance can be detected and compensated.

When the current through the electromagnet has stabilized, a voltage detect switch 170 is momentarily closed to transfer the voltage level across the current sensing resistor through a resistor 180 to a sample and hold capacitor 182. Amplifier 184 acts as a buffer amplifier to provide the voltage level to the signal processor so that any change in that level can be detected and compensated for. Typical waveforms are depicted in FIG. 5. The voltage across the coil may optionally be measured by differentially detecting the positive supply and the FET 162 voltages after the coil current has stabilized. These voltages and the coil current can then be used to determine the coil resistance.

Although the foregoing discussion describes only one pair of electrodes used to detect the flow voltage, the invention is not so limited and two or more pairs may be used. A similar situation is shown in FIG. 9 in the inventor's U.S. Pat. Nos. 6,431,011 and 6,463,807.

When two or more pairs of flow sensing electrodes are used and their signals are summed to provide a single output signal, the diagnostic signals introduced near the beginning of the signal path can be reduced in magnitude to equal the offset signal provided at the output of the signal path. Alternatively, the diagnostic signals introduced may simply be switched near the beginning of the signal path from one electrode pair to another for the same purpose.

Note that the electrode circuits of the present invention may include switches 161, 163 to momentarily connect the electrodes to ground as was described in U.S. Pat. Nos. 6,431, 011 and 6,463,807. This would provide a zero flow reference which would exclude noise signals such as that from power lines or other 60 Hz sources. If the rate output signal were different between the electrodes being grounded and not grounded, it would be an indication that the noise signals were excessive and that corrective action was needed.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. An apparatus for automatically calibrating a magnetic flow meter comprising an electromagnet and at least one pair of sensing electrodes connected to an amplifier circuit operable to amplify electrode voltages by a selected amplification factor, the apparatus comprising:
   a single voltage reference source selectively connectable to an input of the amplifier circuit through a first voltage divider and to an output of the amplifier circuit through a second voltage divider, wherein a ratio of the voltage provided by the second voltage divider to the voltage provided by the first voltage divider is substantially equal to the selected amplification factor;
   sampling circuitry operable to determine a magnitude of an error difference between a first output from the amplifier circuit at a first time when the single voltage reference source is connected and a second output from the amplifier circuit at a second time when the single voltage reference source is not connected; and
   span control circuitry operable to change the selected amplification factor responsive to the magnitude of the error difference.

2. The apparatus of claim 1 further comprising:
   drive circuitry operable to provide a dead time interval between drive pulses during which no current is supplied to the electromagnet;
   a zero error detector operable during the dead time interval to determine a zero error signal at the output of the amplifier circuit; and
   zero control circuitry operable to reset a zero point of the amplifier circuit responsive to the zero error signal.

3. The apparatus of claim 1 further comprising:
   drive circuitry operable to provide drive pulses to the electromagnet; and
   rise time measurement circuitry operable to measure a rise time of one of the drive pulses and to determine therefrom a value of inductance of the electromagnet's coil.

4. The apparatus of claim 1 wherein each electrode is respectively capacitively coupled to a respective amplifier input, the apparatus further comprising a respective DC current source connected to each electrode to provide a positive bias thereto.

5. The apparatus of claim 1 wherein at least one of the electrodes is connected to an empty pipe detector comprising
   a voltage source connected to the at least one electrode and to a first terminal of a sensing amplifier;
   a capacitor coupled to the amplifier circuit and connected to the first terminal of the sensing amplifier to modulate a voltage at the first terminal in phase with a signal from the at least one electrode; and
   an electric ground resistively connected to a second terminal of the sensing amplifier.

6. The apparatus of claim 1 further comprising an electric power source selectively connectable to at least one of the electrodes to apply a positive DC voltage thereto.

7. The apparatus of claim 1 wherein each of the voltage dividers comprises respective resistors having respective values varying less than 0.1% during a service lifetime of the magnetic flowmeter.

8. The apparatus of claim 1 wherein the sampling circuitry comprises a pair of sample and hold circuits connected in parallel to the output of the amplifier circuit and to a differential amplifier.

* * * * *